United States Patent
Kovacs et al.

(10) Patent No.: US 10,681,567 B2
(45) Date of Patent: Jun. 9, 2020

(54) CONFIGURATION OF RADIO COMMUNICATION IN RADIO-ASSISTED ROAD TRAFFIC MANAGEMENT SCENARIOS

(71) Applicant: Nokia Solutions and Networks Oy, Espoo (FI)

(72) Inventors: Istvan Zsolt Kovacs, Aalborg (DK); Beatriz Soret, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 280 days.

(21) Appl. No.: 15/749,595

(22) PCT Filed: Aug. 31, 2015

(86) PCT No.: PCT/EP2015/069834
§ 371 (c)(1),
(2) Date: Feb. 1, 2018

(87) PCT Pub. No.: WO2017/036510
PCT Pub. Date: Mar. 9, 2017

(65) Prior Publication Data
US 2018/0224846 A1 Aug. 9, 2018

(51) Int. Cl.
*H04W 24/02* (2009.01)
*H04W 4/70* (2018.01)
(Continued)

(52) U.S. Cl.
CPC .......... *H04W 24/02* (2013.01); *G05D 1/0027* (2013.01); *G08G 1/0112* (2013.01);
(Continued)

(58) Field of Classification Search
CPC ......... H04W 24/02; H04W 4/70; H04W 4/46; H04W 4/44; G05D 1/0027; G05D 1/0285;
(Continued)

(56) References Cited

U.S. PATENT DOCUMENTS

2015/0038091 A1* 2/2015 Serrano .................. H04L 67/12
455/68
2015/0296411 A1* 10/2015 Meyer .................. G08G 1/0112
370/336
(Continued)

FOREIGN PATENT DOCUMENTS

| JP | 2011087174 A | 4/2011 |
|---|---|---|
| JP | 2012185668 A | 9/2012 |

(Continued)

OTHER PUBLICATIONS

"Intelligent Transport Systems (ITS); Vehicular Communications; Basic Set of Applications; Part 2: Specification of cooperative Awareness Basic Service", Draft ETSI EN 302 637-2, V1.3.0, Aug. 2013, pp. 1-41.
(Continued)

*Primary Examiner* — Courtney D Heinle
(74) *Attorney, Agent, or Firm* — Nokia Technologies Oy (57) ABSTRACT

There are provided measures for configuration of radio communication in radio-assisted road traffic management scenarios. Such measures exemplarily comprise (for managing a predetermined area in a radio-assisted road traffic management scenario) detecting a specific road traffic condition in said predetermined area, and transmitting a configuration signaling instructing a configuration of at least one radio communication related parameter.

18 Claims, 9 Drawing Sheets

(51) Int. Cl.
*G05D 1/00* (2006.01)
*G08G 1/01* (2006.01)
*G08G 1/0967* (2006.01)
*H04B 7/06* (2006.01)
*H04W 4/46* (2018.01)
*H04W 4/44* (2018.01)
*G05D 1/02* (2020.01)

(52) U.S. Cl.
CPC ......... *G08G 1/0133* (2013.01); *G08G 1/0141* (2013.01); *G08G 1/096725* (2013.01); *G08G 1/096741* (2013.01); *G08G 1/096783* (2013.01); *H04B 7/0617* (2013.01); *H04W 4/70* (2018.02); *G05D 1/0285* (2013.01); *G05D 2201/0213* (2013.01); *H04W 4/44* (2018.02); *H04W 4/46* (2018.02)

(58) Field of Classification Search
CPC ......... G05D 2201/0213; G08G 1/0112; G08G 1/0133; G08G 1/0141; G08G 1/096725; G08G 1/096741; G08G 1/096783; H04B 7/0617
See application file for complete search history.

(56) References Cited

U.S. PATENT DOCUMENTS

2018/0224846 A1* 8/2018 Kovacs ............... G08G 1/0112
2018/0249525 A1* 8/2018 Brahmi ............... H04W 28/021

FOREIGN PATENT DOCUMENTS

WO 2014/048486 A1 4/2014
WO 2014/198325 A1 12/2014

OTHER PUBLICATIONS

"Intelligent Transport Systems (ITS); Vehicular Communications;Basic Set of Applications; Definitions", ETSI TR 102 638, V1.1.1, Jun. 2009, pp. 1-81.

"Intelligent Transport Systems (ITS); Users and applications requirements; Part 1: Facility layer structure, functional requirements and specifications", ETSI TS 102 894-1 V1.1.1, Aug. 2013, pp. 1-56.

"Intelligent Transport Systems (ITS); Users and applications requirements; Part 2: Applications and facilities layercommon data dictionary", ETSI TS 102 894-2 V1.1.1, Aug. 2013, pp. 1-78.

International Search Report and Written Opinion received for corresponding Patent Cooperation Treaty Application No. PCT/EP2015/069834, dated May 3, 2016, 15 pages.

Office Action received for corresponding European Patent Application No. 15756906.2, dated Dec. 3, 2018, 4 pages.

Office action received for corresponding Japanese Patent Application No. 2018-506109, dated Jan. 23, 2019, 3 pages of office action and 3 pages of office action translation available.

* cited by examiner

CONFIGURATION OF RADIO COMMUNICATION IN RADIO-ASSISTED ROAD TRAFFIC MANAGEMENT SCENARIOS

RELATED APPLICATION

This application was originally filed as PCT Application No. PCT/EP2015/069834 filed Aug. 31, 2015.

FIELD

The present invention relates to configuration of radio communication in radio-assisted road traffic management scenarios. More specifically, the present invention exemplarily relates to measures (including methods, apparatuses and computer program products) for realizing configuration of radio communication in radio-assisted road traffic management scenarios.

BACKGROUND

The present specification generally relates to $3^{rd}$ Generation Partnership Project (3GPP) Long Term Evolution (LTE) or 3GPP 5G machine type communication (MTC). In particular, the present specification addresses mission critical MTC between a vehicle and radio network infrastructure (vehicle-to-infrastructure, V2I) in radio-assisted road traffic management scenarios.

In the field of automotive engineering, assisted driving and autonomous driving are of increased importance. The difference between the two modes is the level of automation thereof. Namely, in assisted driving, the driver still has control of the vehicle with some automation thanks to cooperative decisions among vehicles and/or network (e.g. emergency braking when approaching the end of a traffic jam with high speed), whereas autonomous driving is without intervention of a driver. Intelligent transportation systems (ITS) provide a framework (also radio communication related) for both, assisted driving and autonomous driving. From the communication point of view, assisted driving is one of the target use cases of LTE MTC services, while autonomous driving is one of the target use cases of 5G MTC services. For autonomous driving, MTC devices are embedded in vehicles/cars (vehicular MTC device, in-vehicle MTC device). Such MTC devices need to enable V2I radio communications and vehicle-to-vehicle (V2V) radio communications as operation modes. For these operation modes, strict latency and reliability radio requirements have to be met. Further, network infrastructure equipment (or network nodes or base stations (BS), i.e., road side units (RU, e.g. BS with edge computing capabilities) are likely to play a very important role.

To enable autonomous driving, various radio communication modes are envisioned to be used in terms of broadcast (BC), multicast (MC) or unicast (UC). These radio communication modes are envisioned to be used for both, V2V and V2I radio links. Hence, a vehicular MTC device would have to support switching between (some of) these communication (transmission/reception) modes autonomously and/or with timely assistance from a serving RU.

A typical example scenario for autonomous driving is given below. According to such example scenario, vehicles are driving along a suburban freeway/highway. Sensor based mechanisms (utilizing sensors of respective vehicles) provide both safety on the road and efficient utilization of available road infrastructure (e.g. platooning, etc). LTE or 5G MTC radio communications complement the sensor based mechanisms.

In this scenario, one RU may be able cover a larger geographical area, and to assist the autonomous driving of several hundred (up to several thousands) vehicles at the time, potentially even to cover several roads.

It is conceivable that for such services and radio deployment conditions advanced processing power is needed. ITS specific algorithms are to be implemented in (or close to) the RU using network edge computing solutions, such as a radio applications cloud server (RACS) solution.

Such algorithms may rely on dedicated L1-L3 MTC radio procedures to be able to support switching between BC/MC/UC operating modes of involved communication nodes (RU and vehicles).

In relation to ITS radio communication it is known to inform road users (e.g. vehicles) and RU (infrastructure) about each other's position, dynamics and attributes. Utilizing this exchanged information, a cooperative awareness (CA) can be achieved.

In particular, it is known to achieve CA by regular exchange of information among vehicles (V2V, in general all kind of road users) and between vehicles and road side infrastructure (V2I and infrastructure-to-vehicle (I2V)) based on wireless networks, called vehicle-to-X (V2X) networks. The transmitted periodic messages are known as CA messages (CAM), and their management is performed by a CA basic service as part of a facilities layer within ITS communication architecture.

The known principles have in common that these do not meet challenges posed by autonomous driving in radio-assisted road traffic management scenarios.

Thus, the problem arises that communication configurations may be suboptimal in view of specific requirements in particular of autonomous driving in radio-assisted road traffic management scenarios.

Hence, there is a need to provide for configuration of radio communication in radio-assisted road traffic management scenarios.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method for managing a predetermined area in a radio-assisted road traffic management scenario, comprising detecting a specific road traffic condition in said predetermined area, and transmitting a configuration signaling instructing a configuration of at least one radio communication related parameter.

According to an exemplary aspect of the present invention, there is provided a method in a radio-assisted road traffic management scenario, comprising receiving a configuration signaling instructing a configuration of at least one radio communication related parameter based on a specific road traffic condition in a predetermined area, and setting said configuration of said at least one radio communication related parameter.

According to an exemplary aspect of the present invention, there is provided an apparatus for managing a predetermined area in a radio-assisted road traffic management scenario, comprising at least one processor and at least one memory including a computer program code, wherein the at least one memory and the computer program code are configured, with the at least one processor, to cause the apparatus to perform operations comprising detecting a specific road traffic condition in said predetermined area, and transmitting a configuration signaling instructing a configuration of at least one radio communication related parameter.

According to an exemplary aspect of the present invention, there is provided an apparatus in a radio-assisted road traffic management scenario, comprising at least one processor and at least one memory including a computer program code, wherein the at least one memory and the computer program code are configured, with the at least one processor, to cause the apparatus to perform operations comprising receiving a configuration signaling instructing a configuration of at least one radio communication related parameter based on a specific road traffic condition in a predetermined area, and setting said configuration of said at least one radio communication related parameter.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient determination switching of radio communication modes, or more general, of radio communication characteristics, in view of challenges and specific situations rising in particular in relation to ITS in radio-assisted road traffic management scenarios, to thereby solve at least part of the problems and drawbacks identified in relation to the prior art.

By way of exemplary embodiments of the present invention, there is provided configuration of radio communication in radio-assisted road traffic management scenarios. More specifically, by way of exemplary embodiments of the present invention, there are provided measures and mechanisms for realizing configuration of radio communication in radio-assisted road traffic management scenarios.

Thus, improvement is achieved by methods, apparatuses and computer program products enabling/realizing configuration of radio communication in radio-assisted road traffic management scenarios.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, ITS related processing and communication with respect to autonomous driving in radio-assisted road traffic management scenarios is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) configuration of radio communication in radio-assisted road traffic management scenarios.

For the description of exemplary embodiments of the present invention, the availability of the following radio communication capabilities are assumed.

The following is assumed:
  an ITS management algorithm running in the network RU is capable of aggregating information received from vehicles in a service area (a predetermined area served/managed by the RU), and of responding in a timely manner to the received information, a network RU is capable of using BC/MC and UC transmission modes simultaneously or at least in a time multiplexed manner, a vehicle MTC device is capable of using BC/MC and UC reception modes simultaneously or at least in a time multiplexed manner, a vehicle MTC device is capable of using BC transmission mode for V2V communications and UC transmission mode for V2I communications, and of using these transmission modes simultaneously or in a time multiplexed manner, (all considered) vehicles are capable of detecting and communicating other vehicles via V2V radio sensing within a V2V radio range and/or via traditional vehicular sensors (e.g. light detection and ranging (LiDAR), etc); parameters and an operating mode of the V2V radio sensing can be re-configured from a serving RU or autonomously by an ITS application in the respective vehicles, (all considered) vehicles are capable of aggregating detailed information about themselves combined with (basic) information about all other vehicles detected via V2V; this aggregated information is periodically reported to the serving RU via configured UC transmissions (e.g. CAM messages), and the network RU broadcasts or relays information received via individual UC transmissions from the vehicles in the service area.

It is noted that the reliability and latency of radio communications via BC/MC and UC is very different. Hence, these modes may be used adaptively and possibly on an on-demand basis depending on the road and driving conditions.

Accordingly, in line with exemplary embodiments of the present invention, switching between BC/MC and UC radio communication modes (for communication to/from (group of) vehicles assisted by the RU) is addressed.

Figure 1:
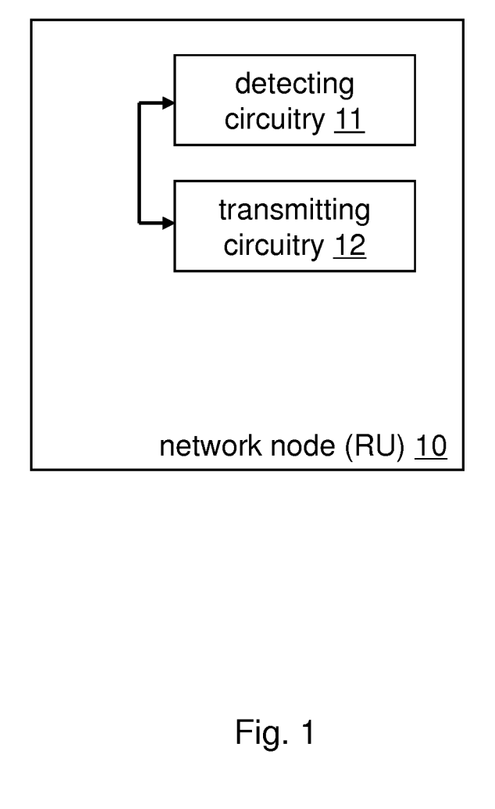
FIG. 1 is a block diagram illustrating an apparatus according to exemplary embodiments of the present invention.
Figure 4:
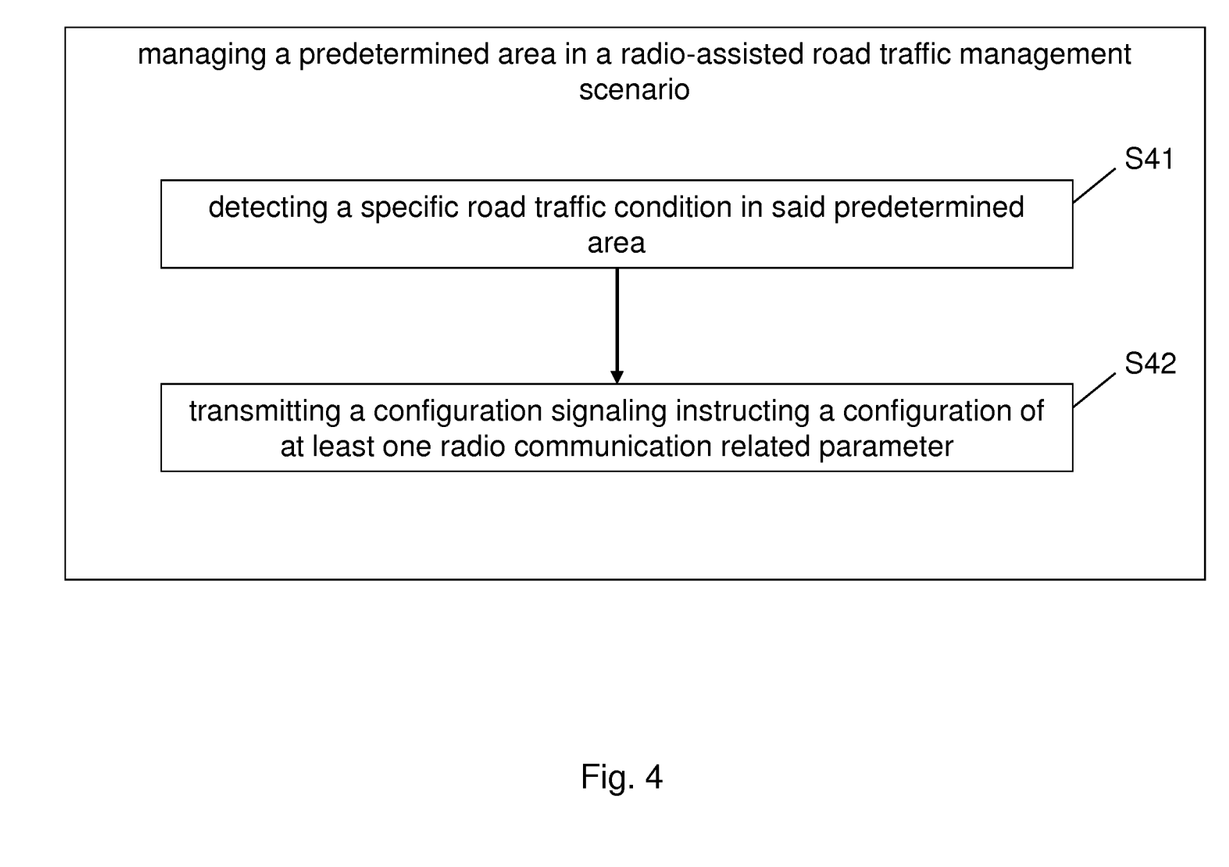
FIG. 4 is a schematic diagram of a procedure according to exemplary embodiments of the present invention.

FIG. 1 is a block diagram illustrating an apparatus according to exemplary embodiments of the present invention. The apparatus may be a network node 10 such as a base station or road side unit for managing a predetermined area in a radio-assisted road traffic management scenario. The apparatus comprises a detecting circuitry 11 and a transmitting circuitry 12. The detecting circuitry 11 detects a specific road traffic condition in said predetermined area. The transmitting circuitry 12 transmits a configuration signaling instructing a configuration of at least one radio communication related parameter. FIG. 4 is a schematic diagram of a procedure according to exemplary embodiments of the present invention. The apparatus according to FIG. 1 may perform the method of FIG. 4 but is not limited to this method. The method of FIG. 4 may be performed by the apparatus of FIG. 1 but is not limited to being performed by this apparatus.

As shown in FIG. 4, a procedure for managing a predetermined area in a radio-assisted road traffic management scenario according to exemplary embodiments of the present invention comprises an operation of detecting (S41) a specific road traffic condition in said predetermined area, and an operation of transmitting (S42) a configuration signaling instructing a configuration of at least one radio communication related parameter.

Figure 2:
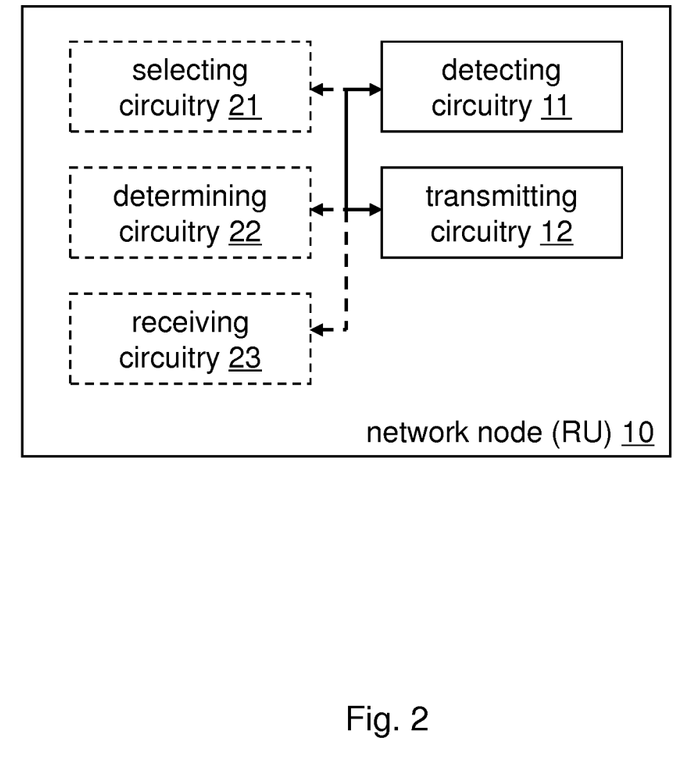
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a selecting circuitry 21, a determining circuitry 22, and a receiving circuitry 23.

In an embodiment at least some of the functionalities of the apparatus shown in FIG. 1 or 2 may be shared between two physically separate devices forming one operational entity. Therefore, the apparatus may be seen to depict the operational entity comprising one or more physically separate devices for executing at least some of the described processes.

According to a variation of the procedure shown in FIG. 4, according to exemplary embodiments of the present invention, said configuration signaling includes a timer value indicative of a validity period of said at least one radio communication related parameter.

According to further exemplary embodiments of the present invention, said configuration of said at least one radio communication related parameter is indicative of a vehicle-to-vehicle radio sensing mode.

According to still further exemplary embodiments of the present invention, (in relation to said vehicle-to-vehicle radio sensing mode) said configuration of said at least one radio communication related parameter includes at least one of an increase in a transmission power related to vehicle-to-vehicle radio sensing, a switching of a radio transmission rate related to said vehicle-to-vehicle radio sensing, a switching of a radio transmission carrier frequency related to said vehicle-to-vehicle radio sensing, a switching of a radio transmission carrier bandwidth related to said vehicle-to-vehicle radio sensing, and an activation of beam forming (beamforming) related to said vehicle-to-vehicle radio sensing.

According to further exemplary embodiments of the present invention, said configuration of said at least one radio communication related parameter is indicative of a vehicle-to-infrastructure communication mode.

According to still further exemplary embodiments of the present invention, (in relation to said vehicle-to-infrastructure communication mode) said configuration of said at least one radio communication related parameter includes an application of a selected radio unicast mode among a plurality of radio unicast modes. Unicast mode (i.e. radio unicast mode) may provide good reliability for the communication and low latency. In one embodiment, the applied unicast mode is applied instead of otherwise applied broadcast or multicast mode. In one embodiment, the applied unicast mode may provide highest reliability among a plurality of unicast modes. In another embodiment, the applied radio unicast mode may provide lowest latency among said plurality of unicast modes. The plurality of unicast modes may differ from each other e.g. in transmission power, target block error ratio (BLER), hybrid automatic repeat request (HARQ) parameters, and number of re-transmissions, respectively affecting the resulting reliability (target communication reliability) and latency (target communication latency) of the respective unicast mode.

According to a variation of the procedure shown in FIG. 4, exemplary additional operations are given, which are inherently independent from each other as such. According to such variation, an exemplary method according to exemplary embodiments of the present invention may comprise an operation of selecting said selected radio unicast mode among said plurality of radio unicast modes based on a predetermined criterion. Here, the predetermined criterion may be indicative of at least one of a target communication latency and a target communication reliability, as explained above.

In more concrete terms, according to exemplary embodiments, it might be desirable to have higher or lower reliability and/or higher and lower latency in the communication dependent on e.g. the distance of a vehicle (e.g. V1) to the road hazard/accident or to the group of vehicles G1 to connect to, or dependent on the speed of the involved cars, or dependent on the traffic density on the considered road/the considered road portion, or dependent on a combination of the mentioned conditions.

For example, with very high traffic density it may be desired to increase the reliability because otherwise it may lead to some retransmission attempts that will increase more the load of the system. Thus, a radio unicast mode may be selected which encourages a high reliability.

As a further example to the contrary, with a very short distance to the hazard, the latency may be considered critical, and thus a radio unicast mode may be selected which encourages a low latency.

As a further example, if there is no hazard/accident but just a group G1 to connect to, then more retransmission attempts may be acceptable.

Concluding, if a radio unicast mode with very high reliability is to be selected, then the latency requirement will necessarily be a bit more relaxed. Contrary thereto, if the reliability requirement is considered a bit more relaxed, a lower latency can be expected.

It is noted that according to exemplary embodiments, the selection is not limited to the mentioned examples but may be adapted to fulfill any demands or motivations.

According to a variation of the procedure shown in FIG. 4, exemplary additional operations are given, which are inherently independent from each other as such. According to such variation, an exemplary method according to exemplary embodiments of the present invention may comprise an operation of determining said configuration of said at least one radio communication related parameter based on at least one of said specific road traffic condition in said predetermined area, status information on vehicles in said predetermined area, and map information on predetermined area.

According to a variation of the procedure shown in FIG. 4, exemplary details of the detecting operation (S41) are given, which are inherently independent from each other as such.

Such exemplary detecting operation (S41) according to exemplary embodiments of the present invention may comprise an operation of receiving a message indicative of said specific road traffic condition in said predetermined area.

According to still further exemplary embodiments of the present invention, said specific road traffic condition is at least one of an identified road traffic danger spot in said predetermined area, an identified road traffic accident scene in said predetermined area, and an identified unexpected driving maneuver of a vehicle in said predetermined area.

Figure 3:
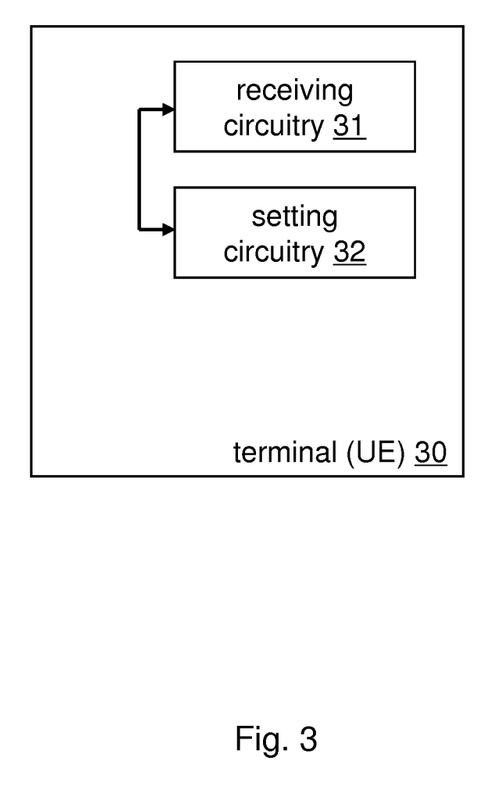
FIG. 3 is a block diagram illustrating an apparatus according to exemplary embodiments of the present invention.
Figure 5:
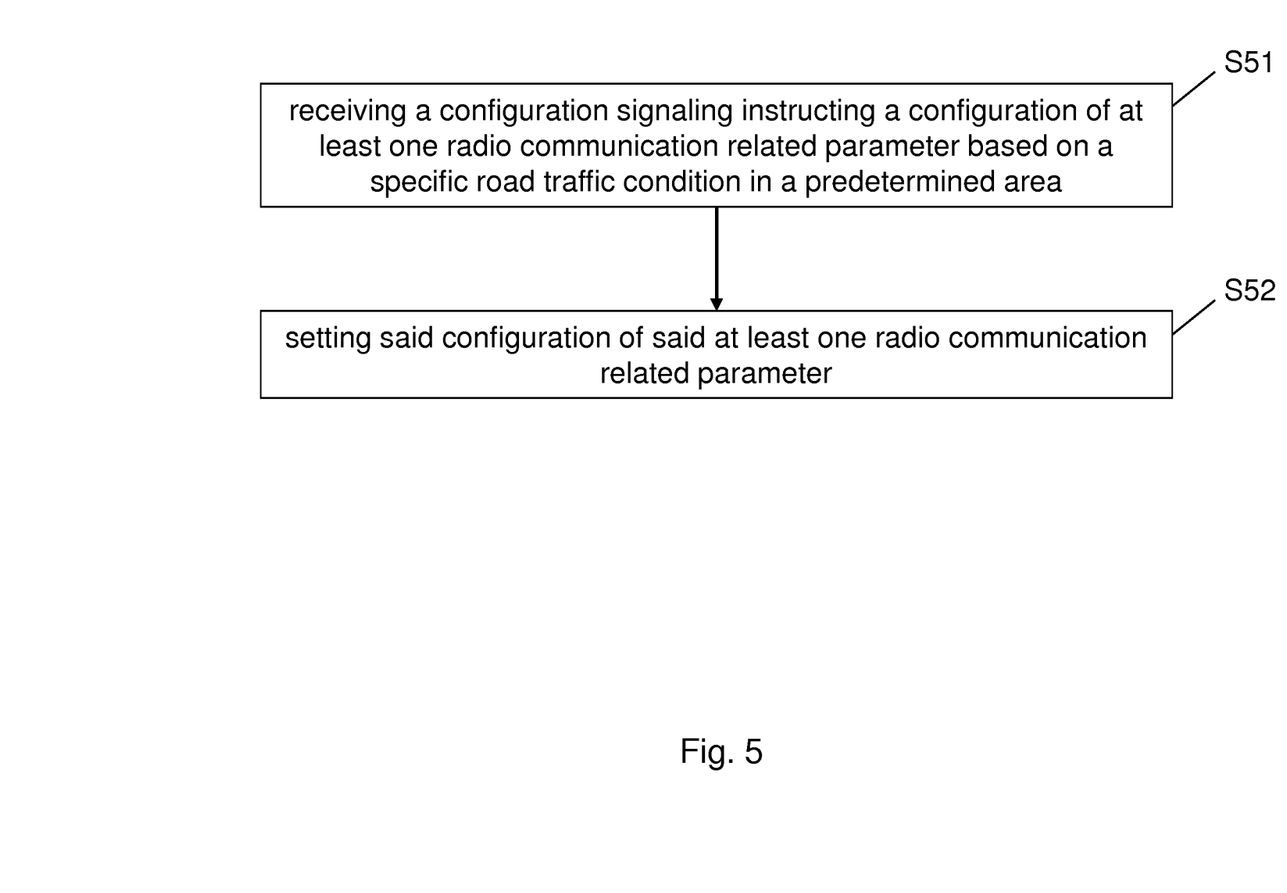
FIG. 5 is a schematic diagram of a procedure according to exemplary embodiments of the present invention.

FIG. 3 is a block diagram illustrating an apparatus according to exemplary embodiments of the present invention. The apparatus may be a terminal 30 such as a user equipment or vehicular machine type communication device in a radio-assisted road traffic management scenario. The apparatus comprises a receiving circuitry 31 and a setting circuitry 32. The receiving circuitry 31 receives a configuration signaling instructing a configuration of at least one radio communication related parameter based on a specific road traffic condition in a predetermined area. The setting circuitry 32 sets said configuration of said at least one radio communication related parameter. FIG. 5 is a schematic diagram of a procedure according to exemplary embodiments of the present invention. The apparatus according to FIG. 3 may perform the method of FIG. 5 but is not limited to this method. The method of FIG. 5 may be performed by the apparatus of FIG. 3 but is not limited to being performed by this apparatus.

As shown in FIG. 5, a procedure in a radio-assisted road traffic management scenario according to exemplary embodiments of the present invention comprises an operation of receiving (S51) a configuration signaling instructing a configuration of at least one radio communication related parameter based on a specific road traffic condition in a predetermined area, and an operation of setting (S52) said configuration of said at least one radio communication related parameter.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to a variation of the procedure shown in FIG. 5, according to exemplary embodiments of the present invention, said configuration signaling includes a timer value indicative of a validity period of said at least one radio communication related parameter.

According to further exemplary embodiments of the present invention, said configuration of said at least one radio communication related parameter is indicative of a vehicle-to-vehicle radio sensing mode.

According to still further exemplary embodiments of the present invention, said configuration of said at least one radio communication related parameter includes at least one of an increase in a transmission power related to vehicle-to-vehicle radio sensing, a switching of a radio transmission rate related to said vehicle-to-vehicle radio sensing, a switching of a radio transmission carrier frequency related to said vehicle-to-vehicle radio sensing, a switching of a radio transmission carrier bandwidth related to said vehicle-to-vehicle radio sensing, and an activation of beamforming related to said vehicle-to-vehicle radio sensing.

According to further exemplary embodiments of the present invention, said configuration of said at least one radio communication related parameter is indicative of a vehicle-to-infrastructure communication mode.

According to still further exemplary embodiments of the present invention, said configuration of said at least one radio communication related parameter includes an application of a selected radio unicast mode According to a variation of the procedure shown in FIG. 5, said selected radio unicast mode is selected among said plurality of radio unicast modes based on a predetermined criterion. Here, the predetermined criterion may be indicative of at least one of a target communication latency and a target communication reliability, as explained above.

According to further exemplary embodiments of the present invention, said specific road traffic condition is at least one of an identified road traffic danger spot in said predetermined area, an identified road traffic accident scene in said predetermined area, and an identified unexpected driving maneuver of a vehicle in said predetermined area.

Figure 6:
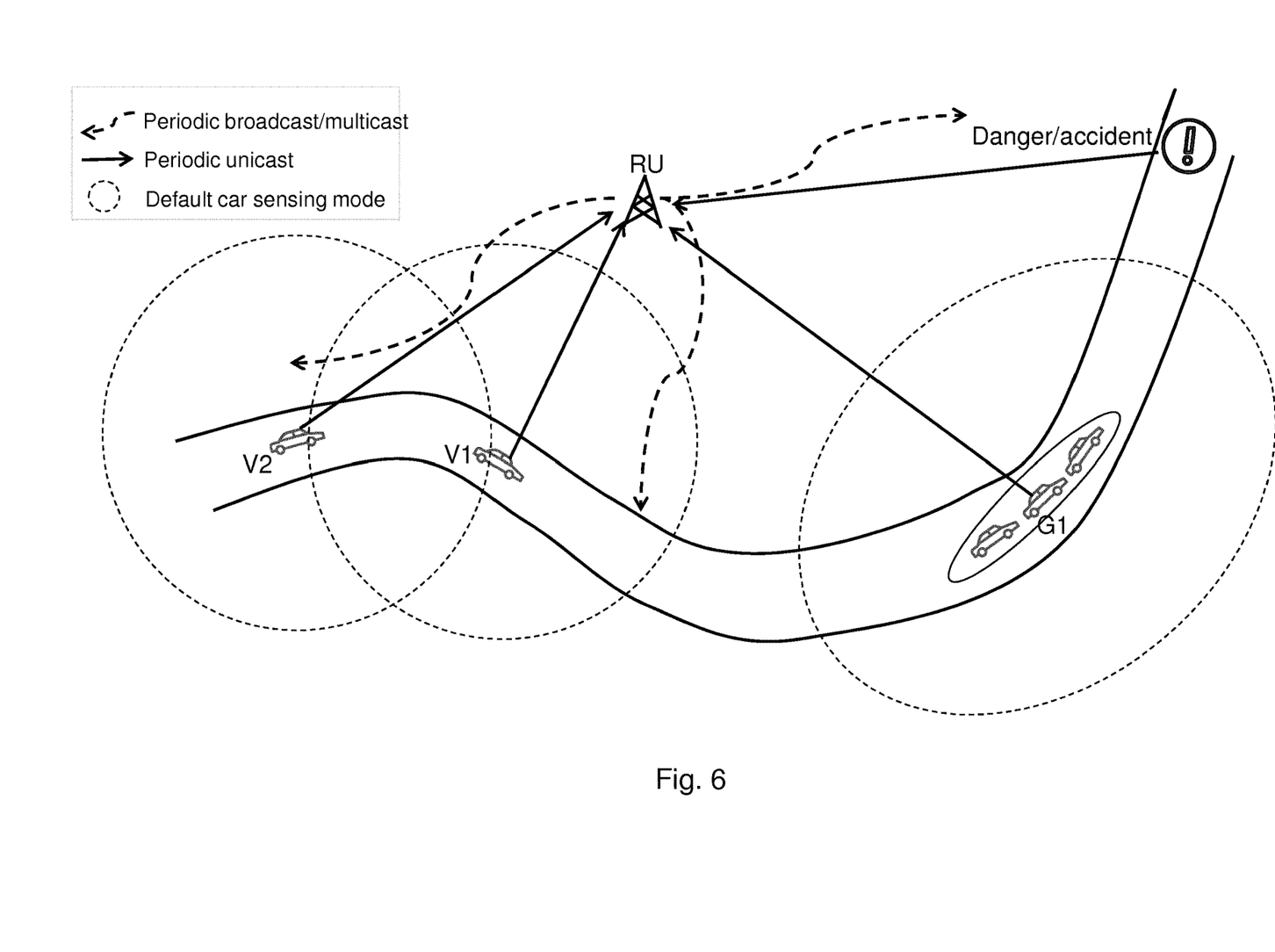
FIG. 6 shows a schematic diagram of an example of an autonomous driving scenario with signaling variants according to exemplary embodiments of the present invention.
Figure 7:
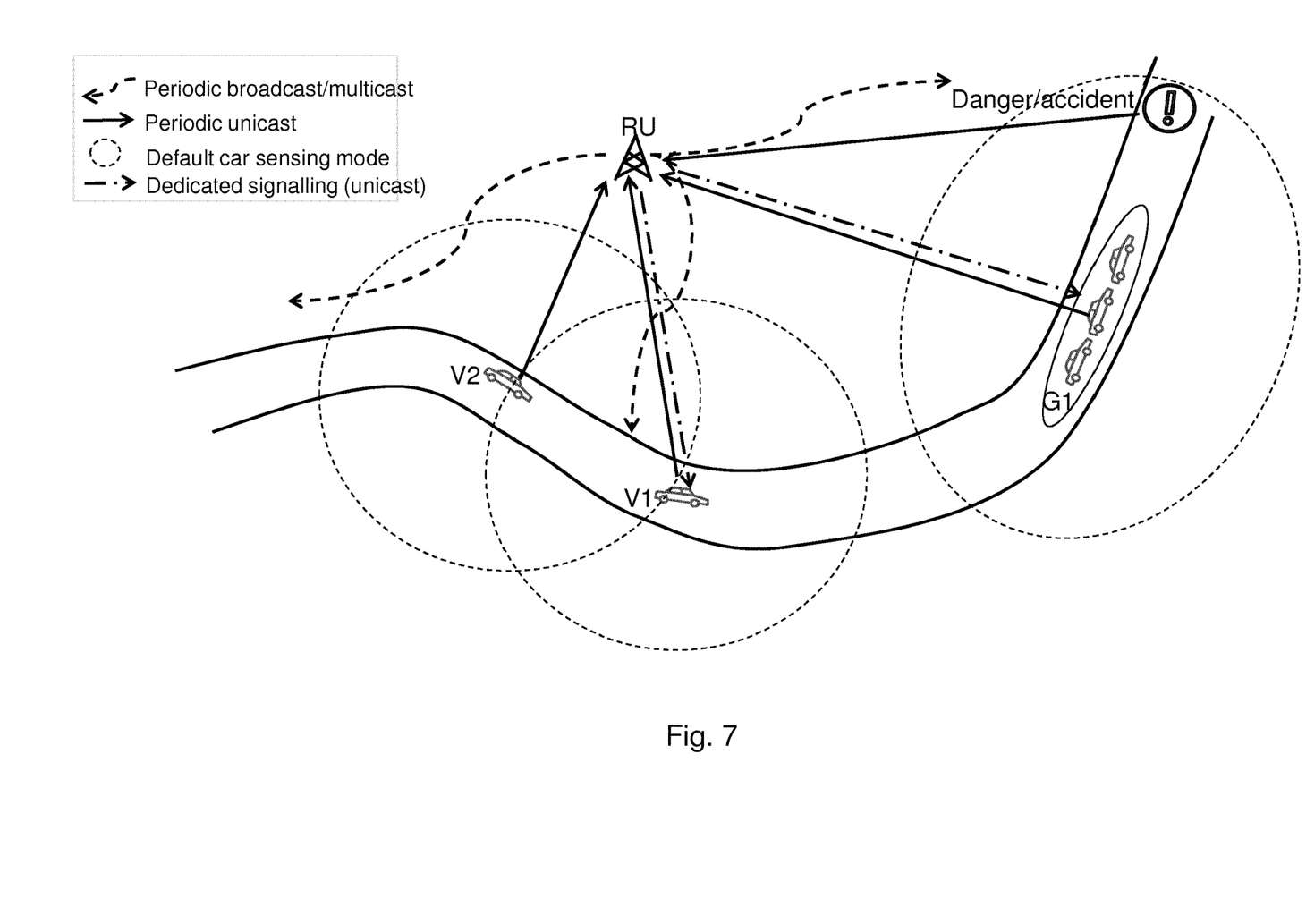
FIG. 7 shows a schematic diagram of an example of an autonomous driving scenario with signaling variants according to exemplary embodiments of the present invention.
Figure 8:
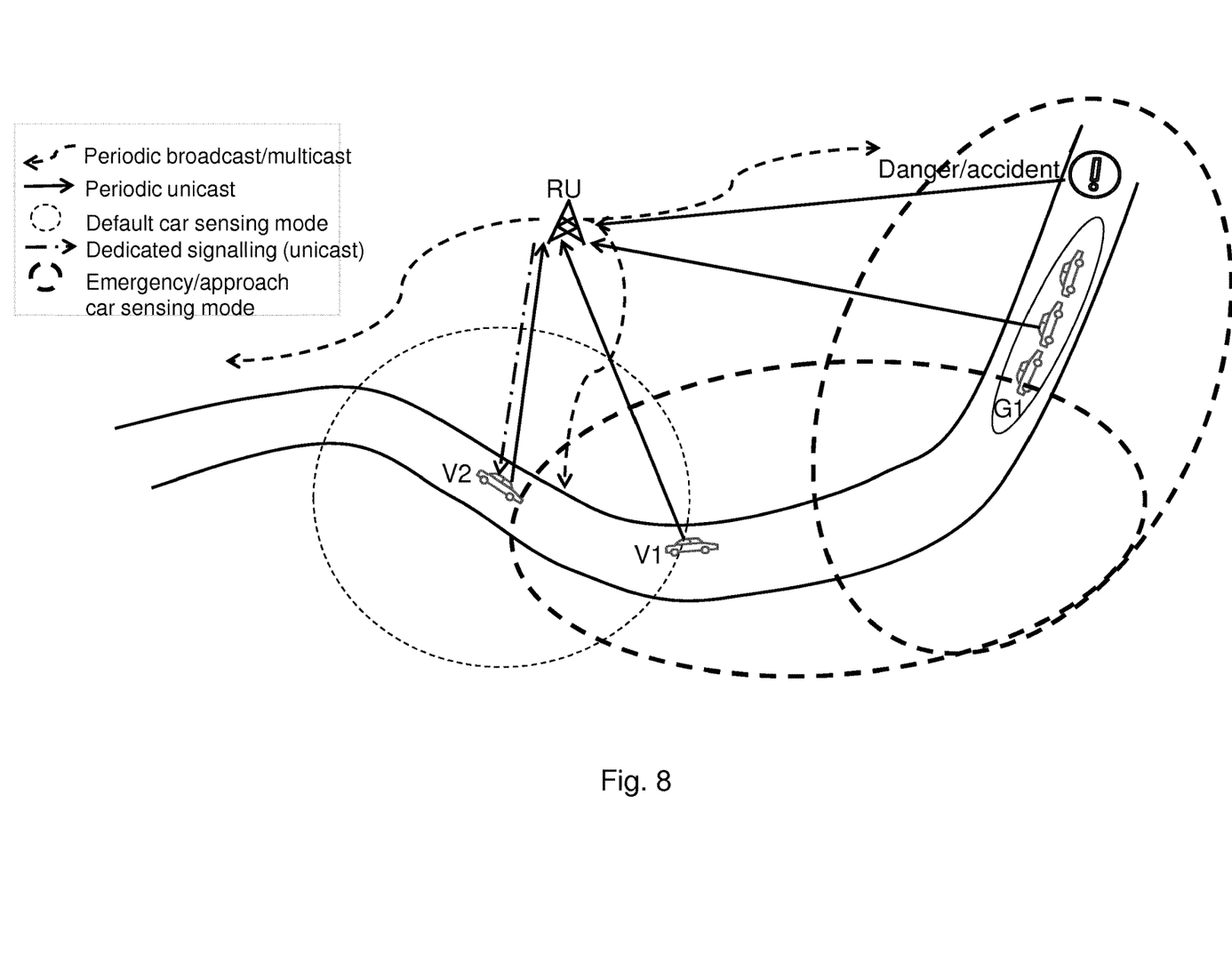
FIG. 8 shows a schematic diagram of an example of an autonomous driving scenario with signaling variants according to exemplary embodiments of the present invention.

FIGS. 6, 7 and 8 respectively show a schematic diagram of an example of an autonomous driving scenario with signaling variants according to exemplary embodiments of the present invention. In particular, each of FIGS. 6, 7 and 8 represents a respective time snapshot in an autonomous driving scenario in order to explain exemplary embodiments of the present invention. The depicted autonomous driving scenario is simplified, and the Figures are not to scale.

According to the example scenario, all vehicles can be driving individually or grouped e.g. in a platoon configuration, and this grouping can change at any time.

In the depicted example scenario, an RU (e.g. the apparatus 10) and all vehicles (e.g. the apparatus 30) implement the features according to the above listed assumptions regarding availability of radio communication capabilities.

As can be seen on FIGS. 6, 7 and 8, in the depicted example scenario, the RU serves/manages a predetermined area (not shown) comprising at least a part of a road, on which vehicles (G1, V1, V2) are travelling. A "danger/accident" (or similar) road condition (!) happened in relation to the road. Periodic BC/MC transmissions are communicated from the RU to the air interface (i.e. receivable by the other vehicles). Further, periodic UC transmissions are respectively communicated from the vehicles (G1, V1, V2) to the RU. Here, another option according to exemplary embodiments of the present invention (not shown in the FIGS. 6, 7 and 8) may be that the RU is able to listen to BC/MC transmissions from all vehicles, such that dedicated periodic reporting from the vehicles is not necessary. Each vehicle (or group of vehicles) has a sensing range of a default car sensing mode, in which information on respective other vehicles may be gathered.

In particular, in the depicted example scenario, the RU serves three groups of autonomously driving vehicles, namely group G1 (e.g. a platoon), group V1 (e.g. a single vehicle) and group V2 (e.g. another single vehicle).

In addition, in the depicted example scenario, V1 and V2 are in sensing range (V2V radio sensing and/or traditional vehicular sensors) of each other and can use V2V radio communication and/or traditional sensors (i.e. sensor techniques beyond radio communication, e.g. as listed above) to gather information about each other.

Moreover, in the depicted example scenario, the group G1 is outside the radio and sensor range of V1 and V2.

Finally, in the depicted example scenario, the RU is informed about a "danger/accident" (or similar) road condition which requires changes in the driving pattern of all the vehicles approaching the "danger/accident" area.

Such road condition (road traffic condition) may alternatively be that a vehicle in front starts breaking un-expectedly e.g. due to a malfunction, a hazard, a driving error, etc.

In the depicted example scenario according to FIG. 6, none of the vehicles (G1, V1, V2) can detect autonomously the exemplary "danger/accident" road condition. The RU starts to be informed of the exemplary "danger/accident" road condition (e.g. via a UC/BC transmission of a decentralized environmental notification message (DENM), i.e. a dedicated DENM to the network or a broadcasted DENM listened for by the network).

In the depicted example scenario according to FIG. 7 (time snapshot later than FIG. 6), all vehicles have been informed via RU broadcast (relayed) message(s) about the "danger/accident" road traffic condition. The G1 vehicles are now able to detect also autonomously the "danger/accident" road condition ahead of them and may start a safety maneuver. The RU ITS algorithm determines that vehicle V1 approaches the group G1 while vehicle V1 was not yet able to detect autonomously group G1 due to the limited (normal/default) V2V (radio) sensing range.

Therefore, RU initiates a dedicated (UC) communication/signaling to vehicle V1 and group G1 indicating that it recommends an 'inter-vehicle approach' mode to be triggered.

According to exemplary embodiments of the present invention, the RU may use a standardized radio re-configuration procedure i.e., may send configurations via dedicated signaling (to group G1 and vehicle V1).

According to exemplary embodiments of the present invention, such configurations may include a timer mechanism (timeout) which defines a time window where it is mandatory to re-configure and use the V2V radio sensing mechanism for the 'inter-vehicle approach' mode, e.g. increase transmission (TX) power, switch frequency, activate beamforming, etc.

The time window means the (minimum) validity of the respective configuration. That is, the configuration may not be changed autonomously during that time window/timer period.

The time window takes into account the time it takes to the vehicle (in particular the apparatus of the vehicle) to change a radio communication related mode. Namely, once the re-configuration is received, the vehicle/car may need some time to collect all the information for the new mode. Even if radio communications are ultra-low latency (5G), the rest of components in the vehicle may not (e.g. sensors).

For example, in relation to LTE device-to device (D2D), a discovery period can take different values, such that a small discovery period would correspond to a "high-alert" mode. A "high-alert" mode in turn might correspond to the 'inter-vehicle approach' mode according to exemplary embodiments of the present invention. Therefore an evolved NodeB (eNodeB, eNB) (e.g the RU) could reconfigure a vehicle via radio resource control (RRC) with a proper discovery period. This D2D related approach requires a configuration of the "high-alert" mode and, at a later time, a new reconfiguration to come back to "normal discovery period". It further requires that the reconfiguration is sent on time, neither too early (unnecessary searches) nor too late.

With the timer (timeout window) according to exemplary embodiments of the present invention, the eNB may send the "high-alert" reconfiguration as soon as it is aware of the emergency situation, and an user equipment (UE) may have more time to set the new mode until the timer is about to expire.

According to further exemplary embodiments of the present invention, such configurations may include a timer mechanism (timeout) which defines a time window where it is mandatory to re-configure and use all V2I communications to the highest reliability UC mode available, to ensure the highest reliability and lowest latency communication link is used.

According to exemplary embodiments of the present invention, the RU is able to estimate the timeout (time value) based on the status information collected from the different vehicles (with position, speed, acceleration, direction, etc.) and the maps of the service area. Namely, based on CAM messages exchanged among vehicles and with the network, the RU can estimate when vehicles V1 and V2 will be close enough to group G1 to communicate with group G1 and whether this estimated point in time is still on time to e.g. react to the danger/accident. Therefore, according to exemplary embodiments of the present invention, if cars move faster, the timeout may be set lower/shorter, while if cars move slower, the timeout may be set higher/longer.

In the depicted example scenario according to FIG. 8 (time snapshot later than FIG. 7), The G1 and V1 vehicles have re-configured their V2I communication and V2V radio sensing according to the control signaling received from the RU as explained in relation to FIG. 7. These re-configured modes have to be kept until the expiration of the corresponding timers. The reconfiguration may comprise that V1 and G1 establish a unicast communication link between V1 and G1, which offers higher reliability and lower latency than broadcast/multicast transmissions.

Here, FIG. 8 exemplifies both, re-configuration and use of V2V radio sensing mechanism for 'inter-vehicle approach' mode and re-configuration and use of all V2I communications to the highest reliability UC mode. Now V1 can autonomously detect the transmission from G1. Also, it may be possible for V2 to detect normal broadcast transmission from V1, due to they being close to each other. In case there was yet another vehicle, V3, further away on the road, the RU may decide to reconfigure its radio communication characteristics similarly. This may comprise e.g. causing the V3 to use unicast mode with V2 or V1. Namely, the ITS management algorithm running in the RU may detect that a dedicated communication link with the (group of) vehicles (e.g. V1, G1) can better assist the autonomous driving and can provide the highest reliability and lowest latency. Namely, since direct routing (e.g. between V1 and G1) when approaching potential danger/accident instead of routing through the network is much faster (much lower latency), according to exemplary embodiments of the present invention it is preferred for the G1 and V1 to adapt parameters so that V1 can hear G1, instead of V1 being reliant upon simply receiving all the required accident information from the RU.

As mentioned before, according to exemplary embodiments of the present invention, the dedicated signaling messages sent by the RU to the (V1 and G1) vehicles to trigger re-configuration of their V2V and V2I communication modes may be standardized. Preferably, all RU and all MTC UEs in the (considered) vehicles support such standards.

According to exemplary embodiments of the present invention, timers (timeout windows) are used as part of respective configuration signaling (instructing a configuration of at least one radio communication related parameter).

Utilizing such timers for the V2V and V2I re-configuration procedures instead of just indicating the request for re-configuration allows for inaccuracies in (potentially outdated) information received from vehicles, fast changing driving conditions, etc. Namely, one possible scenario raising such inaccuracies would be when not all vehicles (the respective apparatuses thereof) have the possibility of the ultra-reliable V2I communications, e.g. older cars, etc. Then, the ITS system cannot rely on the precision of the location information from all vehicles on the road.

Further, since the re-configured states of the V2V and V2I are kept autonomously until the expiration of the corresponding timers according to exemplary embodiments of the present invention, the signaling to the involved vehicles may be reduced. Thereby, more MTC capacity is allowed in the network for addressing the needs of other vehicles.

According to exemplary embodiments of the present invention, the principles of the invention set out before may be applied to machine-to-machine (M2M) communication related LTE (LTE-M) based V2X communication solutions. According to further exemplary embodiments of the present invention, the principles of the invention set out before may be applied to/may be part of interworking with 802.11p or ITS-5G systems considered for ITS.

As mentioned before, according to known approaches, communication configurations may be suboptimal in view of specific requirements in particular of autonomous driving in radio-assisted road traffic management scenarios. Namely, e.g. low TX power may reduce a communication distance to such a degree that a safe inter-vehicle approach would not be possible. In such situation, vehicle V1 may not be able to react to the specific road traffic situation in such an early state as when implementing the present invention.

That is, a configuration according to known approaches may be 'suboptimal' for special driving and road traffic conditions from the radio point of view, while it may be 'optimal' from the radio point of view for normal driving conditions.

According to exemplary embodiments of the present invention, each of such driving conditions may be reflected by respective communication related configurations and communication modes.

According to exemplary embodiments of the present invention, such configurations or communication modes may be configured/selected based on information available to the vehicle, i.e., sensor data, radio detection and ranging (RADAR)/LiDAR data, global positioning system (GPS) data, information from the mobile network (via V2I), and information from other cars (via V2V).

Generally, according to exemplary embodiments of the present invention, the latency of receiving information on the specific road traffic condition (e.g. emergency information) can be reduced.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 9:
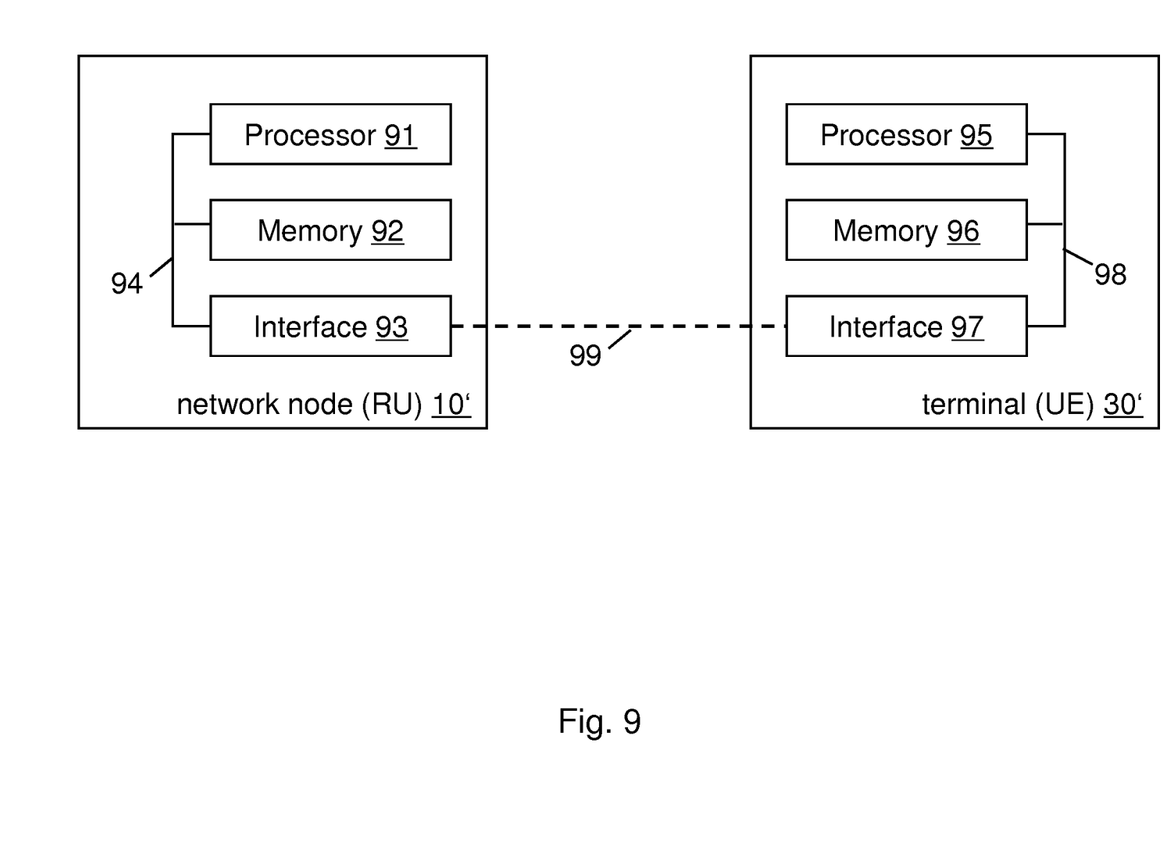
FIG. 9 is a block diagram alternatively illustrating apparatuses according to exemplary embodiments of the present invention.

In FIG. 9, an alternative illustration of apparatuses according to exemplary embodiments of the present invention is depicted. As indicated in FIG. 9, according to exemplary embodiments of the present invention, the apparatus (network node) 10' (corresponding to the network node 10) comprises a processor 91, a memory 92 and an interface 93, which are connected by a bus 94 or the like. Further, according to exemplary embodiments of the present invention, the apparatus (terminal) 30' (corresponding to the terminal 30) comprises a processor 95, a memory 96 and an interface 97, which are connected by a bus 98 or the like, and the apparatuses may be connected via link 99, respectively.

The processor 91/95 and/or the interface 93/97 may also include a modem or the like to facilitate communication over a (hardwire or wireless) link, respectively. The interface 93/97 may include a suitable transceiver coupled to one or more antennas or communication means for (hardwire or wireless) communications with the linked or connected device(s), respectively. The interface 93/97 is generally configured to communicate with at least one other apparatus, i.e. the interface thereof.

The memory 92/96 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 (for managing a predetermined area in a radio-assisted road traffic management scenario) comprises at least one processor 91, at least one memory 92 including computer program code, and at least one interface 93 configured for communication with at least another apparatus. The processor (i.e. the at least one processor 91, with the at least one memory 92 and the computer program code) is configured to perform detecting a specific road traffic condition in said predetermined area (thus the apparatus comprising corresponding means for detecting), and to perform transmitting a configuration signaling instructing a configuration of at least one radio communication related parameter (thus the apparatus comprising corresponding means for transmitting).

According to further exemplary embodiments of the present invention, an apparatus representing the terminal 30 (in a radio-assisted road traffic management scenario) comprises at least one processor 95, at least one memory 96 including computer program code, and at least one interface 97 configured for communication with at least another apparatus. The processor (i.e. the at least one processor 95, with the at least one memory 96 and the computer program code) is configured to perform receiving a configuration signaling instructing a configuration of at least one radio communication related parameter based on a specific road traffic condition in a predetermined area (thus the apparatus comprising corresponding means for receiving), and to perform setting said configuration of said at least one radio communication related parameter (thus the apparatus comprising corresponding means for setting).

For further details regarding the operability/functionality of the individual apparatuses, reference is made to the above description in connection with any one of FIGS. 1 to 8, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for configuration of radio communication in radio-assisted road traffic management scenarios. Such measures exemplarily comprise (for managing a predetermined area in a radio-assisted road traffic management scenario) detecting a specific road traffic condition in said predetermined area, and transmitting a configuration signaling instructing a configuration of at least one radio communication related parameter.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
BC broadcast
BLER block error ratio
BS base station
CA cooperative awareness
CAM CA message
D2D device-to device
DENM decentralized environmental notification message
eNB evolved NodeB, NodeB
HARQ hybrid automatic repeat request
ITS intelligent transportation systems
LiDAR light detection and ranging
LTE Long Term Evolution
LTE-M M2M communication related LTE
M2M machine-to-machine
MC multicast
MTC machine type communication
RACS radio applications cloud server
RADAR radio detection and ranging
RRC radio resource control
RU road side unit
TX transmission
UC unicast
UE user equipment
V2I vehicle-to-infrastructure
V2V vehicle-to-vehicle
V2X vehicle-to-X

The invention claimed is:

1. A method, comprising:
   receiving by an apparatus a configuration signaling instructing a configuration of at least one radio communication related parameter of a radio access technology based on a specific road traffic condition in a predetermined area, and setting, by said apparatus, said configuration of said at least one radio communication related parameter, wherein said configuration is indicative of an increased vehicle-to-vehicle radio sensing range of the radio access technology such that the vehicle-to-vehicle radio sensing range is increased compared to the current vehicle-to-vehicle radio sensing range of the radio access technology; and at least one of transmitting and receiving by said apparatus in accordance with said configuration.

2. An apparatus, comprising:
   at least one processor and at least one memory including a computer program code, wherein the at least one memory and the computer program code are configured, with the at least one processor, to cause the apparatus to perform operations comprising:
   detecting a specific road traffic condition in said predetermined area, and
   in response to detecting, transmitting to at least one device a configuration signaling instructing a configuration of at least one radio communication related parameter of a radio access technology at the at least one device, said configuration being dependent on said detected specific road traffic condition, wherein said configuration is indicative of an increased vehicle-to-vehicle radio sensing range of the radio access technology such that the vehicle-to-vehicle radio sensing range is increased compared to the current vehicle-to-vehicle radio sensing range of the radio access technology.

3. The apparatus according to claim 2, wherein said configuration of said at least one radio communication related parameter includes at least one of:
   an increase in a radio transmission power related to vehicle-to-vehicle radio sensing,
   a switching of a radio transmission rate related to said vehicle-to-vehicle radio sensing,
   a switching of a radio transmission carrier frequency related to said vehicle-to-vehicle radio sensing,
   a switching of a radio transmission carrier bandwidth related to said vehicle-to-vehicle radio sensing, and
   an activation of beamforming related to said vehicle-to-vehicle radio sensing.

4. The apparatus according to claim 2, wherein said configuration of said at least one radio communication related parameter is indicative of a vehicle-to-infrastructure radio communication mode.

5. The apparatus according to claim 4, wherein said configuration of said at least one radio communication related parameter causes the at least one device to switch from a broadcast/multicast mode to a selected radio unicast mode among a plurality of radio unicast modes.

6. The apparatus according to claim 5, wherein the at least one memory and the computer program code are configured, with the at least one processor, to cause the apparatus to further perform operations comprising:
   selecting said selected radio unicast mode among said plurality of radio unicast modes based on a predetermined criterion, wherein
   said predetermined criterion is indicative of at least one of a target communication latency and a target communication reliability.

7. The apparatus according to claim 2, wherein the at least one memory and the computer program code are configured, with the at least one processor, to cause the apparatus to further perform operations comprising:

determining said configuration of said at least one radio communication related parameter based on at least one of:
said specific road traffic condition in said predetermined area,
status information on vehicles in said predetermined area, and
map information on said predetermined area.

8. The apparatus according to claim 2, wherein the at least one memory and the computer program code are configured, with the at least one processor, to cause the apparatus to further perform operations comprising:
receiving a message indicative of said specific road traffic condition in said predetermined area.

9. The apparatus according to claim 2, wherein
said specific road traffic condition is at least one of
an identified road traffic danger spot in said predetermined area,
an identified road traffic accident scene in said predetermined area, and
an identified unexpected driving maneuver of a vehicle in said predetermined area.

10. The apparatus according to claim 2, wherein
the apparatus is operable as or at a base station or access node or network infrastructure equipment or road side unit of a cellular system, and/or
the apparatus is operable in at least one of a LTE and a LTE-A cellular system.

11. An apparatus, comprising:
at least one processor and at least one memory including a computer program code, wherein the at least one memory and the computer program code are configured, with the at least one processor, to cause the apparatus to perform operations comprising:
receiving a configuration signaling instructing a configuration of at least one radio communication related parameter of a radio access technology based on a specific road traffic condition in a predetermined area,
setting said configuration of said at least one radio communication related parameter, wherein said configuration is indicative of an increased vehicle-to-vehicle radio sensing range of the radio access technology such that the vehicle-to-vehicle radio sensing range is increased compared to the current vehicle-to-vehicle radio sensing range of the radio access technology; and
at least one of transmitting and receiving in accordance with said configuration.

12. The apparatus according to claim 11, wherein said configuration signaling includes a timer value indicative of a validity period of said configuration of the at least one radio communication related parameter.

13. The apparatus according to claim 11, wherein said configuration of said at least one radio communication related parameter includes at least one of:
an increase in a radio transmission power related to vehicle-to-vehicle radio sensing,
a switching of a radio transmission rate related to said vehicle-to-vehicle radio sensing,
a switching of a radio transmission carrier frequency related to said vehicle-to-vehicle radio sensing,
a switching of a radio transmission carrier bandwidth related to said vehicle-to-vehicle radio sensing, and
an activation of beamforming related to said vehicle-to-vehicle radio sensing.

14. The apparatus according to claim 11, wherein said configuration of said at least one radio communication related parameter is indicative of a vehicle-to-infrastructure radio communication mode.

15. The apparatus according to claim 14, wherein said configuration of said at least one radio communication related parameter causes the apparatus to switch from a broadcast/multicast mode to a selected radio unicast mode among a plurality of radio unicast modes.

16. The apparatus according to claim 15, wherein said selected radio unicast mode is selected among said plurality of radio unicast modes based on a predetermined criterion, and said predetermined criterion is indicative of at least one of a target communication latency and a target communication reliability.

17. The apparatus according to claim 11, wherein said specific road traffic condition is at least one of:
an identified road traffic danger spot in said predetermined area,
an identified road traffic accident scene in said predetermined area, and
an identified unexpected driving maneuver of a vehicle in said predetermined area.

18. The apparatus according to claim 11, wherein
the apparatus is operable as or at a terminal, user equipment, mobile station, modem or vehicular machine type communication device, and/or
the apparatus is operable in at least one of a LTE and a LTE-A cellular system.

* * * * *